(12) United States Patent
Yan et al.

(10) Patent No.: US 11,988,845 B2
(45) Date of Patent: May 21, 2024

(54) NEAR-EYE DISPLAY DEVICES

(71) Applicant: BOE Technology Group Co., Ltd., Beijing (CN)

(72) Inventors: Meng Yan, Beijing (CN); Wei Wang, Beijing (CN); Qiuyu Ling, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 749 days.

(21) Appl. No.: 17/183,486

(22) Filed: Feb. 24, 2021

(65) Prior Publication Data

US 2021/0302752 A1 Sep. 30, 2021

(30) Foreign Application Priority Data

Mar. 31, 2020 (CN) .......................... 202010244470.8

(51) Int. Cl.
*G02B 27/09* (2006.01)
*G02B 27/01* (2006.01)

(52) U.S. Cl.
CPC ..... *G02B 27/0961* (2013.01); *G02B 27/0172* (2013.01); *G02B 2027/011* (2013.01)

(58) Field of Classification Search
CPC ...... G02B 27/00–648; G02B 2027/0105–0198
See application file for complete search history.

(56) References Cited

U.S. PATENT DOCUMENTS 10,509,466 B1\* 12/2019 Miller ....................... G06T 7/60
2019/0278087 A1 9/2019 Cheng et al.
2020/0103654 A1\* 4/2020 Cheng ................ G02B 27/0172

FOREIGN PATENT DOCUMENTS

CN 110187506 A 8/2019
WO 2018103551 A1 6/2018

OTHER PUBLICATIONS

CN202010244470.8 first office action.

\* cited by examiner

*Primary Examiner* — Bao-Luan Q Le
*Assistant Examiner* — Christopher A Lamb, II
(74) *Attorney, Agent, or Firm* — IPro, PLLC

(57) ABSTRACT

A near-eye display device, comprising: a pixel island assembly, comprising a plurality of light-emitting elements; and a microlens array assembly, comprising a microlens array and an optical surface member, the optical surface member having an optically transmissive free-form surface, a planar total-reflection surface and an optically reflective free-form surface, each surface of which intersects with other two surfaces; wherein light emitted by the pixel island assembly enters the optical surface member through the optically transmissive free-form surface, is reflected by the planar total-reflection surface and by the optically reflective free-form surface in sequence, and then exits the optical surface member through the microlens array.

19 Claims, 3 Drawing Sheets

| Providing a pixel island assembly, the pixel island assembly including a plurality of light-emitting elements | S100 |

↓

| Providing a microlens array assembly, the microlens array assembly including a microlens array and an optical surface member | S200 |

NEAR-EYE DISPLAY DEVICES

TECHNICAL FIELD

Embodiments of the present disclosure relate to near-eye display devices.

BACKGROUND

In near-eye display technology, image information to be displayed is optically transmitted to the human eye directly, thereby directly transmitting information to a user.

SUMMARY

At least one embodiment of the present disclosure provides a near-eye display device. The near-eye display device includes a pixel island assembly including a plurality of light-emitting elements and a microlens array assembly, the microlens array assembly including a microlens array and an optical surface member, the optical surface member having an optically transmissive free-form surface, a planar total-reflection surface and an optically reflective free-form surface, each of which intersects with other two surfaces, wherein light emitted by the pixel island assembly is transmitted into the optical surface member through the optically transmissive free-form surface, and is reflected by the planar total-reflection surface and by the optically reflective free-form surface in sequence, and then is transmitted to the microlens and emitted from the microlens.

In some embodiments of the present disclosure, the optical surface member has a prismatic structure of a polymer material, and the optically transmissive free-form surface, the planar total-reflection surface, and the optically reflective free-form surface are non-parallel surfaces of the prismatic structure.

In some embodiments of the present disclosure, a refractive index of the polymer material ranges from 1.49 to 1.6, and an optical transmittance of the polymer material is not less than 90%.

In some embodiments of the present disclosure, the polymer material includes at least one of polymethyl methacrylate (PMMA), polycarbonate (PC), and cyclo-olefin copolymer (COC).

In some embodiments of the present disclosure, the optical surface member has a thickness of 5 mm to 15 mm in a direction perpendicular to a plane which is perpendicular to both the optically transmissive free-form surface and the planar total-reflection surface, and has a height of 10 mm to 30 mm in a direction perpendicular to the planar total-reflection surface.

In some embodiments of the present disclosure, a trans-reflective film is provided at a side of the reflective free-form surface facing away from the optical surface member.

In some embodiments of the present disclosure, an angle between the optically transmissive free-form surface and the planar total-reflection surface, an angle between the planar total-reflection surface and the optically reflective free-form surface and an angle between the optically reflective free-form surface and the optically transmissive free-form surface are configured in such a way that the light emitted by the pixel island assembly is incident on the microlens array in a manner of parallel light.

In some embodiments of the present disclosure, a shape of the optically transmissive free-form surface and a shape of the optically reflective free-form surface are configured to be capable of correcting aberration.

In some embodiments of the present disclosure, the microlens array assembly further includes a natural light correction element, and a position of the natural light correction element is configured in such a way that ambient light passing through the natural light correction element enters the optical surface member through the optically reflective free-form surface and then exits the optical surface member, and a light incident surface of the natural light correction element is a free-form surface that is configured to correct distortion of ambient light passing through the optically reflective free-form surface.

BRIEF DESCRIPTION OF THE DRAWINGS

The above and/or additional aspects and advantages of the present disclosure will become obvious and easy to understand from the description of the embodiments in conjunction with the following figures, in which.

DETAILED DESCRIPTION OF THE EMBODIMENTS

The embodiments of the present disclosure will be described in detail below. Examples of the embodiments are illustrated in the accompanying figures, wherein same or similar reference signs indicate same or similar elements or elements with same or similar functions. The embodiments described below with reference to the accompanying figures are exemplary, and are only intended to explain the present disclosure, and cannot be construed as a limit to the present disclosure.

Application scenarios of near-eye display include virtual reality (VR), augmented reality (AR), mixed reality (MR), and the like. Main optical implementation manners for near-eye display include optical waveguides, free-form surfaces, light field displays and the like. In display devices in which optical waveguide devices are used to achieve near-eye display, the waveguide devices themselves have small dimensions, however, material for the waveguide is sensitive to wavelength, and chromatic aberration of displayed images is relatively serious. The display technology based on free-form surfaces has a strong capability of correcting aberration, however, display of large view angle requires a great increase in size and volume of optical display devices. Devices of micro-display free-form surface display technology have small sizes, however, it are also difficult for them to achieve display of large view field with a relatively small system size.

Figure 1:
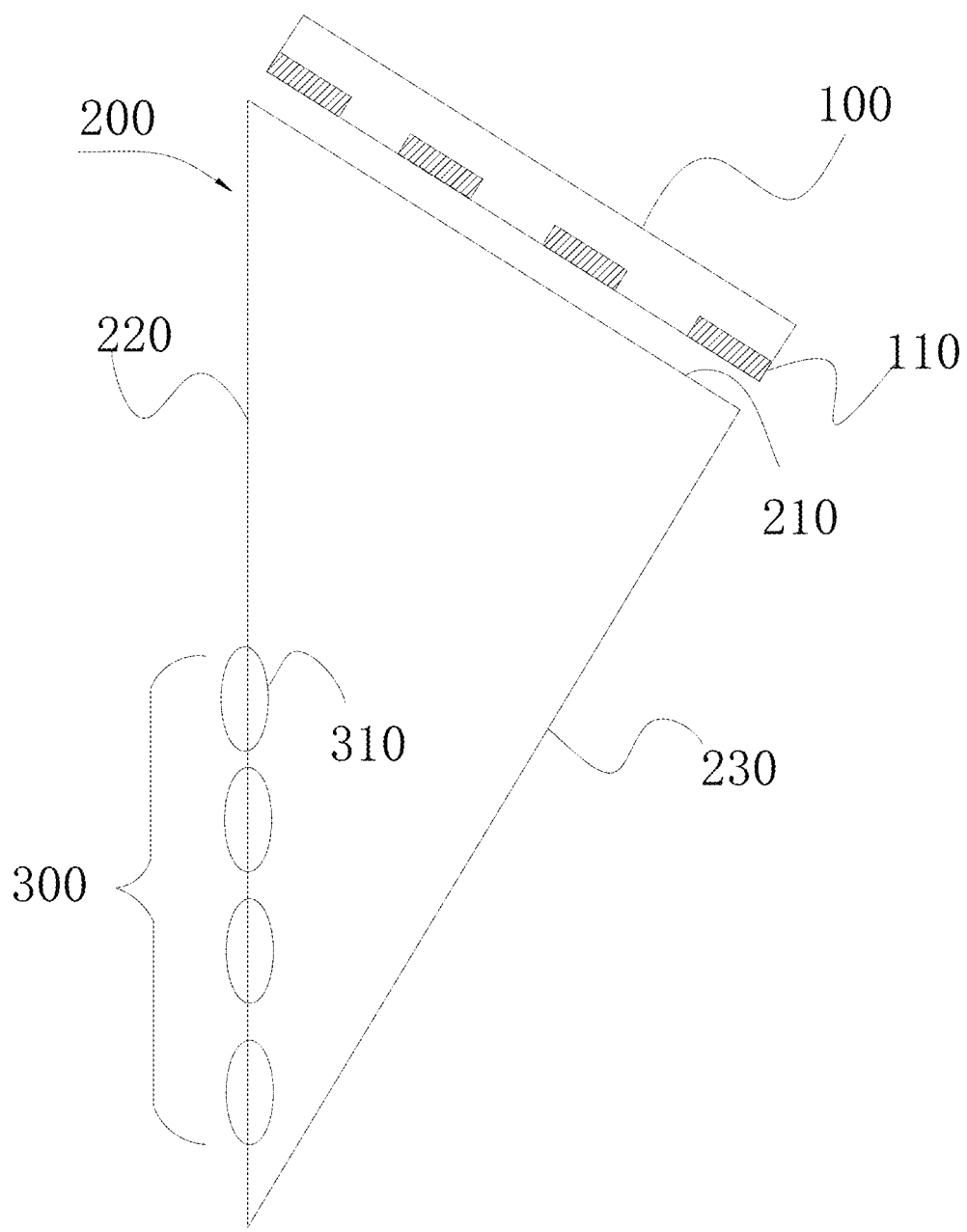
FIG. 1 illustrates a schematic structural view of a near-eye display device according to an embodiment of the present disclosure.

At least one embodiment of the present disclosure provides a near-eye display device. Referring to FIG. 1, the near-eye display device includes a pixel island assembly 100 and a microlens array assembly 20. The pixel island assembly 100 includes a plurality of light-emitting elements 110. The microlens array assembly 20 includes a microlens array 300 and an optical surface member 200. The optical surface member 200 has an optically transmissive free-form surface 210, a planar total-reflection surface 220, and an optically reflective free-form surface 230, each of which intersects with other two surfaces. Light emitted by the pixel island assembly 100 is transmitted into the optical surface member 200 through the transmissive free-form surface 210, and is reflected by the planar total-reflection surface 220 and by the reflective free-form surface 230 in sequence, and then is transmitted to the microlens array 300 and emitted from the microlens array 300.

In the near-eye display device according to the embodiment of the present disclosure, a microlens and a regional pixel island (i.e., a part of the pixel island assembly) are combined to achieve near-eye display. Each combination of microlens and a light-emitting element provides a part of the whole view field, and imaging beam enters human eyes and image angle splicing is performed on the retina, so that the whole view field can be seen by the human eyes. The optical surface member of the device may fold the optical path, and can reduce the size of the optical device and the size of the display device under a condition that guarantees an exit pupil size and an exit pupil distance, thus effectively enlarge a view field of display. At the same time, the free-form surfaces of the optical surface member together with the microlens array are strong in correcting aberration, thus the near-eye display device can achieve splicing display of a slim near-eye VR/AR/MR with a relatively large view field and high imaging capability.

In order to facilitate understanding, operation principle of the near-eye display device will be briefly described below.

Figure 4:
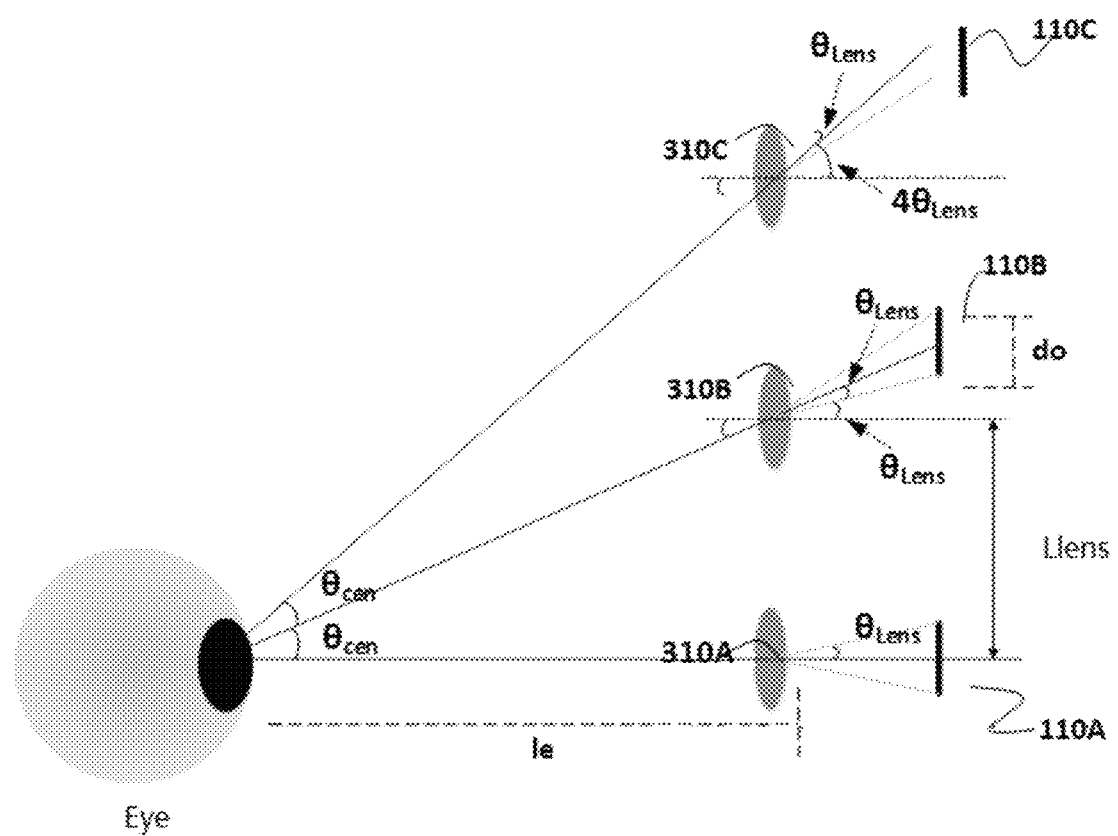
FIG. 4 is a schematic diagram illustrating the principle of angle splicing display according to an embodiment of the present disclosure.

In the near-eye display device according to an embodiment of the present invention, the pixel island assembly 100 and the microlens array 300 are combined to achieve display by splicing angles of beam. For example, the pixel island assembly 100 has a plurality of light emitting elements 110 that are disposed regularly, for example, a plurality of organic light emitting diodes (OLED) arranged in columns. Referring to FIG. 4, each OLED displays a local display picture at a particular angle in the entire display picture. For example, an OLED at the center of a column displays a local display picture from $-\theta_{lens}$ to $+\theta_{lens}$. Light emitted by the OLED enters the human eyes after passing through a corresponding microlens of the microlens array, and a plurality of OLEDs and a plurality of microlenses are combined to jointly display a display picture with display effects such as VR or AR. A plurality of parallel light beams with a certain beam width at a same angle enter the human eyes, and will be focused on a same point on the retina under convergence of crystal lens of the human eyes. The microlens array along with the pixel island assembly 100 control imaging light emitted by two adjacent OLEDs (pixel islands) to perform angle splicing. After the imaging light enters the human eyes, the imaging light is spliced on the retina to achieve splicing display of the image. For example, as illustrated in FIG. 4, the light-emitting element 110B and the microlens 310B together form a combination for displaying sub-image, and the center combination displays a sub-image with an imaging view field angle from $-\theta_{lens}$ to $+\theta_{lens}$; a sub-image provided by an adjacent combination of a light-emitting element 110C and a microlens 310C is spliced with the sub-image provided by the center combination in emergence angle and provide an view field angle of $+\theta_{lens}$ to $+3\theta_{lens}$. Similarly, the light-emitting elements of the pixel island assembly 100 arranged in array and the micro lens of the micro lens array 300 arranged in array are combined to perform angle splicing display. Since the microlens 310 is an optical convex lens in nature, the image observable by the human eyes through the microlens has aberration. In order to obtain good display effects, it is often necessary to introduce an optical free-form surface to perform aberration correction on the imaging of the microlens array, so that problems exist in devices of near-eye display that adopts beam angle splicing and free-form surface technology, such as a relatively large volume of large view field display device, low ambient light transmittance of the overall device, undesired display effect, and the like. In the near-eye display device according to the embodiment of the present disclosure, an optical surface member is introduced to the optical path from the pixel island assembly 100 to the microlens array 300, and a free-form surface and a plane of the optical surface member 200 may be configured to performing processing on light emitted by the pixel island assembly, such as projection, total-reflection and the like, so as to correct the aberrations and to shorten the light path. And meanwhile, as the optical surface member has three optical surfaces intersecting with each other, and light emitted by the pixel island assembly 100 is required to be incident into the optical surface member through the transmissive free-form surface, and to be reflected by the planar total-reflection surface 220 and by the reflective free-form surface 230 in sequence so as to be transmitted to the microlens array 300 and exit the microlens array, the microlens array 300 is required to be located opposite to the optically reflective free-form surface 230. However, there is no pixel island assembly at the side of the reflective free-form surface 230, a part of ambient light may be incident on the human eyes from the side of the reflective free-form surface 230 together with the light emitted by the pixel island assembly, thereby improving brightness of the ambient light, which can enhance the effect of near-eye display.

According to an embodiment of the present disclosure, the optical surface member 200 has a prismatic structure of a polymer material. For example, the optical surface member 200 may be an integrated prismatic member (for example, a triangular prism member) which is formed by injection molding polymer material (such as plastic). The optically transmissive free-form surface 210, the planar total-reflection surface 220, and the optically reflective free-form surface 230 are non-parallel surfaces of the prismatic member. Furthermore, as long as the pixel island assembly 100 is arranged on the side of the optically transmissive free-form surface 210 and the microlens array 300 is arranged at the side of the planar total-reflection surface 220, light emitted by the pixel island assembly may be incident on the human eyes following the light path as described above. In addition, the light emitted by the pixel island assembly enters the interior of the optical surface member 200 through the optically transmissive free-form surface 210, which facilitates to further reduce the size of the display device by folding the optical path.

In some embodiments of the present disclosure, a refractive index of the polymer material forming the optical surface member may ranges from 1.49 to 1.6 and an optical transmittance of the polymer material is not less than 90%, thereby ensuring that the optical surface member has a sufficiently high transmittance, so that the light emitted by the pixel island assembly is totally reflected on the planar total-reflection surface. For example, in an embodiment of the present disclosure, the polymer material may include at least one of polymethyl methacrylate (PMMA), polycarbonate (PC), and cyclic-olefin copolymer (COC), such that the optical surface member may be formed by injection molding.

In the embodiments of the present disclosure, the size of the optical surface member is not specifically limited. The optically transmissive free-form surface and the optically reflective free-form surface are free-form surfaces, the surfaces of which have a plurality of arc structures with different curvatures. A shape of the optically transmissive free-form surface and a shape of the optically reflective free-form surface are configured to be capable of correcting aberration. The specific shapes of the optically transmissive free-form surface and the optically reflective free-form surface are not particularly limited, and one of ordinary skill in the art may design the optically transmissive free-form surface and the optically reflective free-form surface according to actual imaging requirement. According to some embodiments of the present disclosure, the optical surface member may have a thickness of 5 mm to 15 mm in a direction parallel to the optically transmissive free-form surface, and have a height of 10 mm to 30 mm in a direction perpendicular to the planar total-reflection surface. Thus, the performance of the near-eye display device may be further improved.

Figures 2, 3:
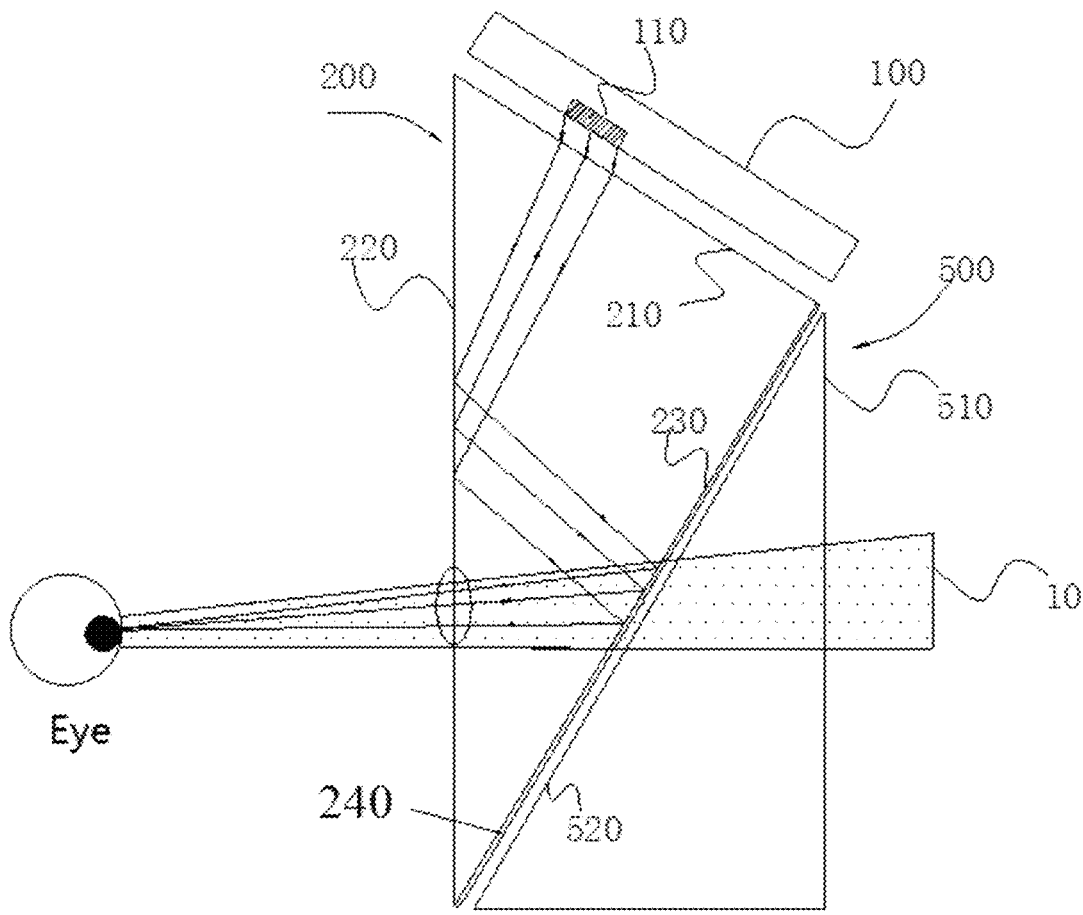
FIG. 2 illustrates a partial structural view of a near-eye display device according to an embodiment of the present disclosure.
FIG. 3 is a flowchart illustrating a method of preparing a near-eye display device according to an embodiment of the present disclosure.

Referring to FIG. 2, in the near-eye display device according to the embodiment of the present invention, the pixel island assembly 100 and the microlens array 300 are separated, and light emitted by the light emitting elements 110 first enters interior of the optical surface member 200 through the optically transmissive free-form surface 210, and then aberration correction may be performed on the light emitted by the light-emitting element 110 by the optically transmissive free-form surface 210, and aberration correction may include, for example, coma, curvature of field, astigmatism, and the like, which is not limited in the present disclosure. Moreover, as the optically transmissive free-form surface 210 has a certain curvature, an angle of the imaging beam emitted by the light-emitting element 110 can be compressed, thus making the entire near-eye display device more compact. The light incident to the interior of the optical surface member 200 passes through the optically transmissive free-form surface 210 and is transmitted to the planar total-reflection surface 220 to be totally reflected. For example, an angle between the pixel island assembly 100 and the planar total-reflection surface 220 may be controlled, and the light is totally reflected on the planar total-reflection surface 220 according to a refractive index of a material forming the optical surface member. Then the totally reflected light is incident on the optically reflective free-form surface 230.

The optically reflective free-form surface 230 is also a free-form surface. For example, it may be an optical free-form surface defined by a high-order polynomial. A shape of the reflective free-form surface can be determined by calculating polynomial coefficients so that it has ability to correct aberration of incident imaging beam. In addition, as the optically reflective free-form surface 230 has focal power, it can converge multiple incident light beams and further reduce the volume of the display device. After the light emitted by the light-emitting element 110 is reflected by the optically reflective free-form surface 230, it may exit the optical surface member 200 from the planar total-reflection surface 220, and enter the microlens array 300 for imaging. Therefore, the microlens array 300 can be arranged on a plane where the planar total-reflection surface 220 is located. Since the optically transmissive free-form surface 210, the planar total-reflection surface 220 and the optically reflective free-form surface 230 of the optical surface member 200 intersect with each other, the pixel island assembly of the near-eye display device is not located directly in front of the microlens array. Since a light transmittance of the optical surface member 200 is much greater than that of the pixel island assembly, more ambient light 10 may be incident on the human eyes from the side of the optically reflective free-form surface 230, so that the near-eye display device has a greater transmittance for the environment light, which can further improve near-eye display effect of the near-eye display device. According to an embodiment of the present disclosure, a transflective film 240 may be provided at a side of the optically reflective free-form surface facing away from the microlens array assembly. That is, a transflective film 240 is arranged at the side of the optically reflective free-form surface close to the air medium. Since the optically reflective free-form surface 230 is required to reflect the light emitted by the light-emitting element, and meanwhile a part of ambient light is required to pass through the optically reflective free-form surface 230 and enter the human eyes, the transflective film 240 is provided at a side of the reflective free-form surface adjacent to the air medium. A transmittance and a reflectance of the transflective film 240 can both be close to 50%. At the optically reflective free-form surface 230, the ambient light 10 and the light emitted by the light emitting element are both transmitted and reflected. As a result, the brightness of the ambient light received by human eyes may be improved while ensuring proper operation of the optical surface member.

In the embodiment of the present disclosure, the pixel island assembly 100 cooperates with the microlens array 300 to achieve angle splicing display. Therefore, an angle between the planar total-reflection surface and the optically reflective free-form surface may be configured in such a way that the light emitted by the pixel island assembly is incident on the microlens array in a manner of parallel light. In this way, it can be ensured that the pixel island assembly and the microlens array may cooperate to achieve the view field splicing display.

In the embodiment of the present disclosure, as more ambient light 10 may be incident on the human eyes from the side of the optically reflective free-form surface 230 and the optically reflective free-form surface 230 has a shape of free-form surface, some distortion may occur to the ambient light incident on the human eyes. In order to further improve the display effect of the near-eye display device, referring to FIG. 2, the micro lens array assembly may further include a natural light correction element 500. A position of the natural light correction element 500 is configured such that the ambient light 10 enters the optical surface member through the optically reflective free-form surface after passing through the natural light correction element and then exits. In addition, a light incident surface 510 of the natural light correction element is a free-form surface, and is configured to correct distortion of the ambient light caused by the reflected optical free-form surface. Therefore, the display performance of the device may be further improved.

At least one embodiment of the present disclosure provides a method of preparing a near-eye display device. The structure and operation principle of the near-eye display device have been described in detail above, and will not be elaborated here. In an embodiment of the present disclosure, referring to FIG. 3, the method may include:

S100: a pixel island assembly is provided, the pixel island assembly including a plurality of light-emitting elements.

For example, the pixel island assembly may comprise a plurality of light-emitting elements that are arranged regularly, such as a plurality of organic light-emitting diodes (OLEDs), and is configured to display a picture to be displayed. The pixel island assembly is configured to cooperate with a microlens array for angle splicing display.

S200: a microlens array assembly is provided, the microlens array assembly including a microlens array and an optical surface member.

As described above, the microlens array assembly includes an optical surface member and a microlens array. The micro lens array is arranged on a side of the planar total-reflection surface of the optical surface member. The microlens array and the optical surface member can be integrally formed by injection molding, or instead, the microlens array may be prepared separately, and then the microlens array is arranged on the surface where the planar total reflection surface of the optical surface member is located. Thus, the aforementioned near-eye display device can be easily obtained.

According to an embodiment of the present invention, the pixel island assembly includes a plurality of light emitting elements arranged in array, and the microlens array includes a plurality of microlenses arranged in array. As described above, the pixel island assembly and the microlens array cooperate with each other as to as achieve the angle splicing display. Therefore, parameters such as a distance between two adjacent lenses in the microlens array, a distance between two adjacent light-emitting elements of the pixel island assembly, and a size of a single light-emitting element need to be coordinated with each other to ensure light emitted by light-emitting elements of the pixel island assembly disposed at different locations may be converged at a point at the pupil. For example, a view field angle provided by a single light-emitting element may be determined according to a length of a single light-emitting element and a focal length of a microlens, and a distance between two adjacent microlenses can be determined according to an exit pupil distance and a view field angle. And a distance between two adjacent light-emitting elements may be determined according to the exit pupil distance, the focal length of the microlens and the view field angle. In this way, it can be ensured that the pixel island assembly and the micro lens array may cooperate with each other to achieve view field splicing display.

In an embodiment of the present disclosure, referring to FIG. 4, as a view field angle $\theta_{lens}$ provided by a single combination of microlens and light-emitting element is relatively small, trigonometric functions of the view field angle $\theta_{lens}$ associated with the light-emitting element and an angle $\theta_{cen}$ of a picture provided by a single combination of microlens and light-emitting element in the human eyes are approximately considered as trigonometric functions of a right triangle. For example, a triangle formed by the center of the light-emitting element 110 (herein, for the convenience of description, the light-emitting element 110 is regarded as a circle, and same approximate calculations may be performed in a case that the light-emitting element 110 has other shapes), an end point of the light-emitting element 110 and the center of a microlens 310 is taken as a right angled triangle, wherein $\theta_{lens}$ is an acute angle of the triangle, a line between the center of the light-emitting element 110 and the center of the microlens 310, and a line between the center of the light-emitting element 110 and the end point are two legs of the right triangle. Thus, $\theta_{lens}$ may be determined jointly by a length $d_o$ of the light-emitting element 110 (110A-110C as illustrated in FIG. 4) and a focal length f of the microlens (a distance between the light-emitting element 110 and the microlens 310) according to following equation (1):

$$\theta_{lens} = \arctan(d_o/2f) \tag{1}$$

Similarly, referring to equation (2), a distance $L_{lens}$ between two adjacent microlenses (310B and 310A as illustrated in FIG. 4) is determined by the exit pupil distance le (a distance between the human eyes and the microlens) and a picture angle $\theta_{cen}$ provided by a single combination of the microlens and the light-emitting element, where $\theta_{cen} = 2\theta_{lens}$:

$$L_{lens} = le \times \tan(\theta_{cen}) \tag{2}$$

Referring to equation (3), a distance $L_{oled}$ between two adjacent light-emitting elements is determined by the exit pupil distance le, the focal length f of the micro lens, and the $\theta_{lens}$:

$$L_{oled} = (le+f) \times \tan(\theta_{cen}) \tag{3}$$

Arrangement of a combination of a microlens and a regional pixel island should meet the above equations and various position parameters may be calculated. At the same time, it should also be met that each combination of a microlens array and a regional pixel island may provide a fixed part of the view field angle (for example, $-\theta_{lens}$ to $+\theta_{lens}$). An image of a view field provided by each light-emitting element on the retina of the human eyes and an image of a view field provided by an adjacent light-emitting element on the retina of human eyes are contiguous to each other, that is, the two images do not overlap with each other, and there is no gap between them. Reducing the focal length of the microlens may achieve a lighter and thinner device, and reducing a diameter of the microlens and a size of the pixel island will increase AR display transparency.

In an embodiment of the present disclosure, the optical surface member is formed by injection molding plastic. Thus, an optical surface member having free-form surfaces can be easily obtained.

In an embodiment of the present disclosure, the method further includes: providing a natural light correction element, the natural light correction element arranged adjacent to the optically reflective free-form surface. The natural light correction element is formed by injection molding plastic.

In the description of the present invention, the orientation or positional relationship indicated by the terms "on", "below", etc. are based on the orientation or positional relationship illustrated in the figures, and are only for the convenience of describing the present disclosure and does not require that the devices according to the present disclosure must be configured or operated in a particular orientation, and thus, they cannot be construed a limit to the present disclosure.

In the present disclosure, the description with reference to the terms "an embodiment", "another embodiment", etc. means that specific features, structures, materials or characteristics described in conjunction with the embodiment are included in at least one embodiment of the present disclosure. In the present disclosure, the schematic representations of the above-mentioned terms are not necessary for the same embodiment or example. Moreover, the described specific features, structures, materials or characteristics can be combined in any one or more embodiments or examples in a suitable manner. In addition, one of ordinary skill in the art can combine the different embodiments or examples and the features of the different embodiments or examples described in this specification without conflict. In addition, it should be noted that in the present disclosure, the terms "first" and "second" are only intended for descriptive purposes, and cannot be understood as indicating or implying relative importance or implicitly indicating the number of the defined technical features.

Although the embodiments of the present disclosure have been illustrated and described above, it may be understood that the above embodiments are exemplary and should not be construed as a limit to the present disclosure. One of ordinary skill in the art can make changes, modifications, replacements or variants to the embodiments of the present disclosure without departing the scope of the present disclosure.

The invention claimed is:

1. A near-eye display device, comprising:
a pixel island assembly, comprising a plurality of light-emitting elements; and
a microlens array assembly, comprising a microlens array and an optical surface member, the optical surface member having an optically transmissive free-form surface, a planar total-reflection surface and an optically reflective free-form surface, each surface of which intersects with other two surfaces;
wherein light emitted by the pixel island assembly enters the optical surface member through the optically transmissive free-form surface, is reflected by the planar total-reflection surface and by the optically reflective free-form surface in sequence, and then exits the optical surface member through the microlens array.

2. The near-eye display device according to claim 1, wherein the optical surface member has a prismatic structure of a polymer material, and the optically transmissive free-form surface, the planar total-reflection surface and the optically reflective free-form surface are non-parallel surfaces of the prismatic structure.

3. The near-eye display device according to claim 2, wherein the optical surface member is formed by injection molding.

4. The near-eye display device according to claim 2, wherein a refractive index of the polymer material ranges from 1.49 to 1.6, and an optical transmittance is not less than 90%.

5. The near-eye display device of claim 4, wherein the polymer material comprises at least one of polymethyl methacrylate (PMMA), polycarbonate (PC), and cyclo-olefin copolymer (COC).

6. The near-eye display device according to claim 4, wherein an angle between the optically reflective free-form surface and the optically transmissive free-form surface is configured such that the light emitted by the pixel island assembly is incident on the microlens array assembly in a manner of parallel light.

7. The near-eye display device according to claim 4, wherein a shape of the optically transmissive free-form surface and a shape of the optically reflective free-form surface are configured to be capable of correcting aberration.

8. The near-eye display device according to claim 4, wherein the microlens array assembly further comprises a natural light correction element, the natural light correction element is configured in such a way that ambient light passing through the natural light correction element enters the optical surface member through the optically reflective free-form surface and then exits the optical surface member, and a light incident surface of the natural light correction element is a free-form surface that is configured to correct distortion of ambient light passing through the optically reflective free-form surface.

9. The near-eye display device according to claim 2, wherein the optical surface member has a thickness of 5 mm to 15 mm in a direction parallel to the optically transmissive free-form surface, and has a height of 10 mm to 30 mm in a direction perpendicular to the planar total-reflection surface.

10. The near-eye display device according to claim 9, wherein an angle between the optically reflective free-form surface and the optically transmissive free-form surface is configured such that the light emitted by the pixel island assembly is incident on the microlens array assembly in a manner of parallel light.

11. The near-eye display device according to claim 9, wherein a shape of the optically transmissive free-form surface and a shape of the optically reflective free-form surface are configured to be capable of correcting aberration.

12. The near-eye display device according to claim 9, wherein the microlens array assembly further comprises a natural light correction element, the natural light correction element is configured in such a way that ambient light passing through the natural light correction element enters the optical surface member through the optically reflective free-form surface and then exits the optical surface member, and a light incident surface of the natural light correction element is a free-form surface that is configured to correct distortion of ambient light passing through the optically reflective free-form surface.

13. The near-eye display device according to claim 2, wherein a transflective film is provided at a side of the optically reflective free-form surface facing away from the optical surface member.

14. The near-eye display device according to claim 2, wherein an angle between the planar total-reflection surface and the optically reflective free-form surface is configured such that the light emitted by the pixel island assembly is incident on the microlens array assembly in a manner of parallel light.

15. The near-eye display device according to claim 2, wherein a shape of the optically transmissive free-form surface and a shape of the optically reflective free-form surface are configured to be capable of correcting aberration.

16. The near-eye display device according to claim 2, wherein the microlens array assembly further comprises a natural light correction element, the natural light correction element is configured in such a way that ambient light passing through the natural light correction element enters the optical surface member through the optically reflective free-form surface and then exits the optical surface member, and a light incident surface of the natural light correction element is a free-form surface that is configured to correct distortion of ambient light passing through the optically reflective free-form surface.

17. The near-eye display device according to claim 1, wherein an angle between the planar total-reflection surface and the optically reflective free-form surface is configured such that the light emitted by the pixel island assembly is incident on the microlens array assembly in a manner of parallel light.

18. The near-eye display device according to claim 1, wherein a shape of the optically transmissive free-form surface and a shape of the optically reflective free-form surface are configured to be capable of correcting aberration.

19. The near-eye display device according to claim 1, wherein the microlens array assembly further comprises a natural light correction element, the natural light correction element is configured in such a way that ambient light passing through the natural light correction element enters the optical surface member through the optically reflective free-form surface and then exits the optical surface member, and a light incident surface of the natural light correction element is a free-form surface that is configured to correct distortion of ambient light passing through the optically reflective free-form surface.

\* \* \* \* \*